Patented Sept. 16, 1941

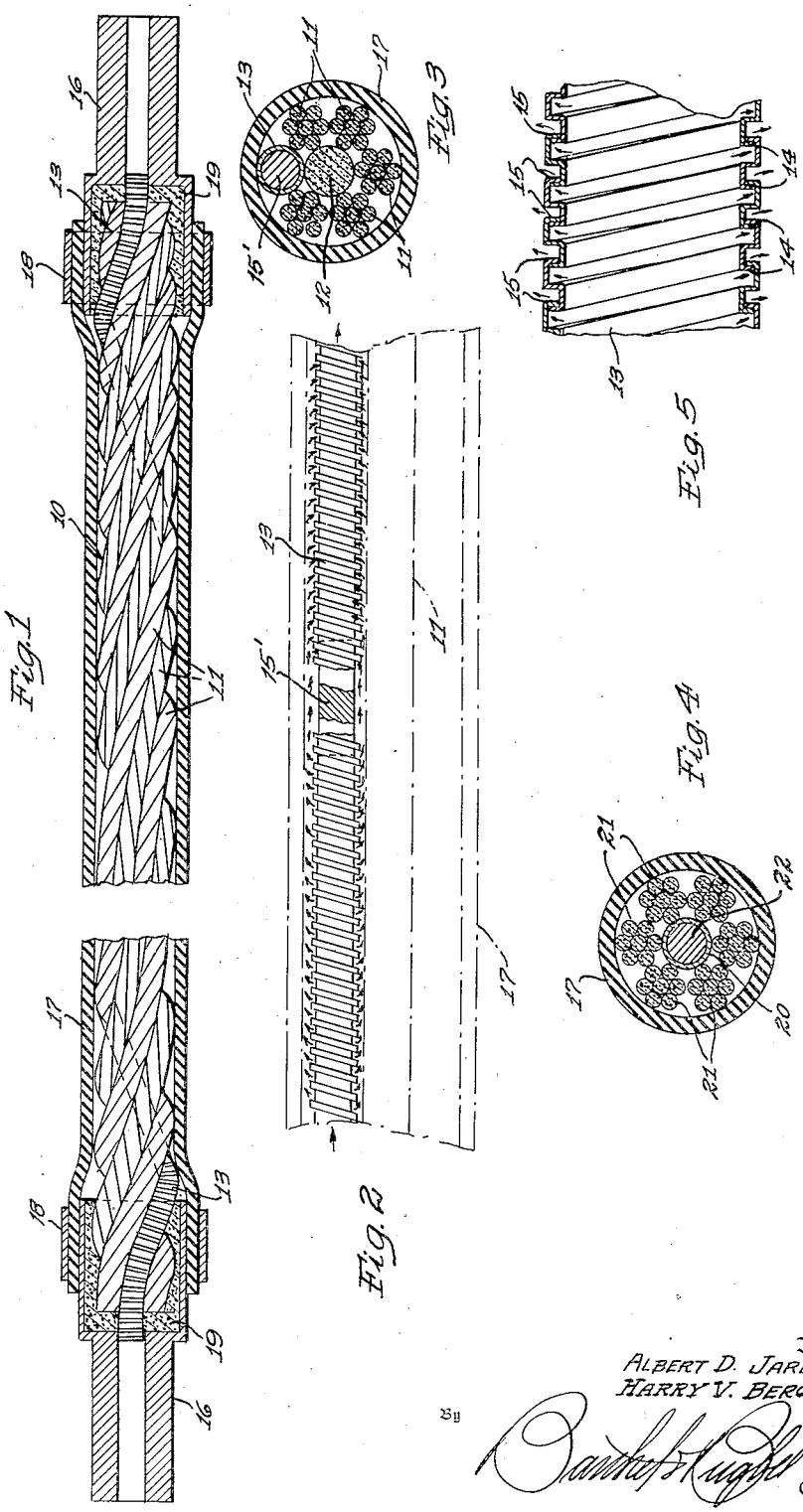

2,256,027

UNITED STATES PATENT OFFICE 2,256,027

FLUID COOLED ELECTRIC CONDUCTOR

Albert D. Jardine and Harry V. Beronius, Detroit, Mich.

Application April 15, 1940, Serial No. 329,712

2 Claims. (Cl. 174—15)

This invention relates generally to electric conductors, and more particularly to fluid cooled conductors.

It is an object of the present invention to provide a new and improved fluid cooled conductor or cable so constructed as to provide for complete permeation of the cable by a fluid cooling medium.

Another object of the invention is to provide an electric conductor having a cooling coil or conduit associated therewith in a new and improved manner to increase rate of conduction of heat away from the electric conductor.

A further object of the invention resides in a construction and arrangement of a cooling coil or conduit which also serves as a strainer to prevent passage of foreign matter passing from the coil or conduit into a sheathing which encloses the electric conductor or cable.

Other objects of the invention will become apparent from the following detailed description taken in connection with the accompanying drawing in which:

Figure 1 is a view shown in longitudinal central section of our improved electric conductor;

Figure 2 is a diagrammatical view of our structure to illustrate flow of the conductor cooling fluid;

Figure 3 is an enlarged view shown in cross section of the fluid cooled electric conductor;

Figure 4 is a cross sectional view showing a modification of the fluid cooled conductor of Figure 3; and Figure 5 is an enlarged fragmentary view shown in longitudinal section of a conduit employed in the cooling of the conductors.

Referring to the drawing by characters of reference, the numeral 10 designates in general an electric conductor or cable which comprises a central wire core 12 about which is spirally wound a plurality of wire strands 11, each of which strands is composed of a plurality of fine, preferably copper wires. In cables or electric conductors required to carry high currents, such as conductors for welding apparatus, it becomes necessary to cool the conductor if its early destruction by heat is to be avoided. In order to cool the conductor 10 in an efficient manner, we provide a flexible conduit 13 for flow therethrough of a cooling fluid or medium such as water, and this conduit is inter-wound spirally with the cable strands 11 to obtain as long a conduit as possible in heat transfer relation with the cable or conductor 10. The particular conduit disclosed is made, as shown in Fig. 5, by a spirally wrapped, preformed metallic strip having a longitudinal offset and having oppositely turned side flanges 14 and 15. When the metal is wound upon itself to form the conduit, the flanges 14 and 15 interlock to keep the metallic strip from unraveling. These interlocking flanges 14 and 15 are the sole means of holding the overlapping turns of the strip in place and as a result the conduit is not fluid tight, but instead the cooling fluid or water flows out of the side of the conduit, as indicated by the arrows in Fig. 2, and permeates the cable or conductor 10. In order to insure complete permeation of the conductor 10, we provide in the conduit a dam or plug 15' to resist free flow of water directly through the conduit, this plug 15' preferably being located substantially midway of the ends of the conduit. The openings in the conduit anterior to the plug 15' constitute fluid outlets and the openings in the conduit posterior to the plug constitute fluid inlets.

For each end of the conductor 10 there is provided a terminal plug 16 having a recessed end in which is received an end portion of the conductor 10, together with an end portion of the conduit 13. Within the recessed ends of the terminal plugs 16, solder or other suitable sealing material 19 is provided to seal the spaces between the conductor strands 11 and between the strands and the conduit 13 and also for securing the terminal plugs 16 to the ends of the conduit or cable 10. Enclosing the conductor 10 and the conduit 13 is a sheathing 17 of electric insulating material such as rubber, the ends of the sheathing 17 fitting respectively over end portions of the terminal plugs 16. Clamps 18 are provided for clamping the ends of the sheathing member tightly to the terminal plugs 16 so that the cooling medium or water will not leak from the ends of the sheathing.

In the modification of Fig. 4 the conduit 20 is the same as the conduit 13 but, instead of being interwound with the cable, the conduit 20 forms the core about which the cable strands 21 are spirally wound. Like the conduit 13, the conduit 20 is provided intermediate its ends with a plug 22 to cause the cooling medium or water to flow out through the overlapping joints of the conduit.

In operation, one of the terminal plugs 16 will be plugged into an electric socket in communication with a source of supply of water under pressure, and the other terminal plug 16 will be plugged into an electric socket in communication with a water return or drain. The provision of the plug 15' will force the water out through the open joints of the conduit and permeate the conduit 10 whence the water will go around the plug and reenter the conduit since this is the only path open for flow of the water.

It will be seen that, in addition to conveying the water, the conduit serves as a double strainer for straining any foreign matter, such as small broken wires, to prevent a collection of wire pieces and other particles from collecting intermediate the ends of the cable. It will further be appreciated that the provision of the plug in the conduit, resisting or preventing flow of water directly through the conduit, enhances the cooling effect, since it forces the water to flow out of the side of the conduit and entirely permeate the conductor or cable. In addition, it will be seen that, by wrapping the conduit spirally with the strands of the conductor or cable, a conduit of maximum length in heat transfer relation with the cable is obtained.

While we have shown and described our invention in detail, it is to be understood that the same is to be limited only by the appended claims for many changes may be made without departing from the spirit and scope of the invention.

What we claim is:

1. A liquid cooled electric cable comprising a conductor, a sheathing of electric insulating material enclosing said conductor, an open-ended conduit for flow of a cooling fluid and arranged in said sheathing in heat transfer relation with said conductor, spaced sealing means sealing the spaces between said conductor and said sheathing and between said conductor and said conduit, means in said conduit to prevent direct flow therethrough and disposed intermediate said sealing means, fluid outlets in said conduit anterior to said third-named means, and fluid inlets in said conduit posterior to said third-named means.

2. A liquid cooled electric cable comprising an open-ended conduit, a plurality of cable strands spirally wound about said conduit to provide an electric conductor, a terminal plug having a recessed end receiving one end of said conductor and the corresponding end of said conduit, sealing material in said recess sealing the spaces between said conductor, conduit and the walls of said recess, a second terminal plug having a recessed end receiving the other end of said conductor and the corresponding end of said conduit, sealing means in the recess of said second-named terminal plug and sealing the spaces between said conductor, conduit and the walls of the recess of said second-named terminal plug, means interposed in said conduit intermediate said sealing means for preventing direct flow of a cooling medium therethrough, outlets in said conduit between one of said sealing means and said interposed means, inlets in said conduit between said interposed means and the other of said sealing means, and an electric insulating sheath enclosing said conductor and said conduit and having its opposite ends sealed respectively to said terminal plugs.

ALBERT D. JARDINE.
HARRY V. BERONIUS.